US011550178B2

(12) United States Patent
Seffer (10) Patent No.: US 11,550,178 B2
(45) Date of Patent: Jan. 10, 2023

(54) LOW-VOLTAGE SMART GLASS

(71) Applicant: DIRTT Environmental Solutions, Ltd., Calgary (CA)

(72) Inventor: Rastislav Seffer, Okotoks (CA)

(73) Assignee: DIRTT ENVIRONMENTAL SOLUTIONS INC., Calgary (CA)

( * ) Notice: Subject to any disclaimer, the term of this patent is extended or adjusted under 35 U.S.C. 154(b) by 711 days.

(21) Appl. No.: 16/316,333

(22) PCT Filed: Jul. 10, 2017

(86) PCT No.: PCT/US2017/041387
§ 371 (c)(1),
(2) Date: Jan. 8, 2019

(87) PCT Pub. No.: WO2018/009936
PCT Pub. Date: Jan. 11, 2018

(65) Prior Publication Data
US 2021/0302770 A1    Sep. 30, 2021

Related U.S. Application Data

(60) Provisional application No. 62/360,019, filed on Jul. 8, 2016.

(51) Int. Cl.
*E06B 9/24* (2006.01)
*G02F 1/133* (2006.01)
*G02F 1/1334* (2006.01)

(52) U.S. Cl.
CPC ............ *G02F 1/13306* (2013.01); *E06B 9/24* (2013.01); *G02F 1/1334* (2013.01);
(Continued)

(58) Field of Classification Search
CPC ....... E06B 2009/2464; E06B 2009/247; E06B 2009/2405; E06B 9/24; G02F 1/1334; G02F 1/13306
See application file for complete search history.

(56) References Cited

U.S. PATENT DOCUMENTS 2,042,290 A    5/1936    Barrett, Jr.
2,658,810 A    11/1953   Howard et al.
(Continued)

FOREIGN PATENT DOCUMENTS

CA    248428 A    3/1925
CA    055086 S    10/1985
(Continued)

OTHER PUBLICATIONS

European Search Report for application No. EP17825076 dated Feb. 10, 2020.
(Continued)

*Primary Examiner* — Mariam Qureshi
(74) *Attorney, Agent, or Firm* — Workman Nydegger (57) ABSTRACT

Embodiments include modular wall systems, smart glass controllers and methods for operating such. In one scenario, a modular wall system is provided which includes a frame with a horizontal stringer. The modular wall system also includes first connectors positioned on the horizontal stringer, and a decorative smart glass pane which includes second connectors configured to attach to the first connectors on the horizontal stringer. The second connectors and the first connectors physically attach the decorative smart glass pane to the modular wall system. A power connector is also included. The power connector is configured to receive a direct current (DC) input voltage from a power source. A power inverter converts the DC input voltage to an alternating current (AC) voltage of less than a threshold maximum number of volts. Furthermore, a smart glass surface is included, which is in communication with an output of the inverter.

19 Claims, 6 Drawing Sheets

(52) U.S. Cl.
CPC . *E06B 2009/2405* (2013.01); *E06B 2009/247* (2013.01); *E06B 2009/2464* (2013.01)

(56) References Cited

U.S. PATENT DOCUMENTS

| | | |
|---|---|---|
| 2,676,481 A | 4/1954 | Hoffman |
| 3,037,593 A | 6/1962 | Webster |
| 3,088,127 A | 5/1963 | Eames |
| 3,180,457 A | 4/1965 | Bohnsack |
| 3,251,169 A | 5/1966 | Cornelissen |
| 3,295,283 A | 1/1967 | Griffith et al. |
| 3,371,454 A | 3/1968 | Anderson |
| 3,486,287 A | 12/1969 | Guillon |
| 3,498,405 A | 3/1970 | Charpentier |
| 3,521,937 A | 7/1970 | Buhrmaster et al. |
| 3,602,226 A | 8/1971 | Ericson |
| 3,603,053 A | 9/1971 | Loghem et al. |
| 3,621,635 A | 11/1971 | Lange |
| 3,646,180 A | 2/1972 | Winnick |
| 3,675,382 A | 7/1972 | Lickliter et al. |
| 3,696,569 A | 10/1972 | Didry |
| 3,751,127 A | 8/1973 | Pospisil et al. |
| 3,852,148 A | 12/1974 | Pryor |
| 3,854,269 A | 12/1974 | Hancock |
| 3,866,364 A | 2/1975 | Pollard |
| 3,869,198 A | 3/1975 | Ballentine |
| 3,885,361 A | 5/1975 | De Schutter |
| 4,027,878 A | 6/1977 | Dadbeh |
| 4,031,680 A | 6/1977 | Stoakes |
| 4,052,832 A | 10/1977 | Jungers et al. |
| 4,065,904 A | 1/1978 | Taylor et al. |
| 4,101,231 A | 7/1978 | Streib |
| 4,103,373 A | 8/1978 | Luedtke et al. |
| 4,128,983 A | 12/1978 | Matsubara |
| 4,142,342 A | 3/1979 | Jungers et al. |
| 4,177,101 A | 12/1979 | Evans |
| 4,277,920 A | 7/1981 | Dixon |
| 4,337,997 A | 7/1982 | Sadoune |
| 4,356,672 A | 11/1982 | Beckman et al. |
| 4,438,614 A | 3/1984 | Raith et al. |
| 4,449,337 A | 5/1984 | Gzym et al. |
| 4,493,172 A | 1/1985 | Jones |
| 4,535,577 A | 8/1985 | Tenser et al. |
| 4,544,300 A | 10/1985 | Lew et al. |
| 4,556,598 A | 12/1985 | Bloom |
| 4,600,975 A | 7/1986 | Roberts |
| 4,631,881 A | 12/1986 | Charman |
| 4,648,231 A | 3/1987 | Laroche |
| 4,652,170 A | 3/1987 | Lew |
| 4,663,228 A | 5/1987 | Bolton |
| 4,688,491 A | 8/1987 | Herrera et al. |
| 4,689,262 A | 8/1987 | Bloom |
| 4,752,101 A | 6/1988 | Yurchenco et al. |
| 4,757,657 A | 7/1988 | Mitchell et al. |
| 4,830,080 A | 5/1989 | Densen |
| D302,497 S | 8/1989 | Zapf |
| D309,381 S | 7/1990 | Buhk |
| D309,382 S | 7/1990 | Buhk |
| D309,384 S | 7/1990 | Buhk |
| D309,385 S | 7/1990 | Buhk |
| D309,386 S | 7/1990 | Buhk |
| 4,991,365 A | 2/1991 | Jackson |
| 5,038,539 A | 8/1991 | Kelley et al. |
| 5,056,285 A | 10/1991 | Frascaroli et al. |
| D321,801 S | 11/1991 | Friedman |
| 5,064,247 A | 11/1991 | Clark et al. |
| 5,067,294 A | 11/1991 | McGowan |
| 5,067,543 A | 11/1991 | Bove |
| D323,251 S | 1/1992 | Zapf |
| 5,086,597 A | 2/1992 | Kelley et al. |
| D325,309 S | 4/1992 | Worrell |
| 5,117,599 A | 6/1992 | Voss |
| 5,125,201 A | 6/1992 | Pieters et al. |
| D327,794 S | 7/1992 | Zapf |
| 5,132,681 A | 7/1992 | Yabe |
| D328,680 S | 8/1992 | Zapf |
| 5,144,777 A | 9/1992 | Fishel et al. |
| D330,295 S | 10/1992 | Zapf |
| 5,155,955 A | 10/1992 | Ball et al. |
| D330,641 S | 11/1992 | Zapf |
| D330,643 S | 11/1992 | Zapf |
| 5,159,793 A | 11/1992 | Deugo et al. |
| D331,335 S | 12/1992 | Zapf |
| D331,513 S | 12/1992 | Zapf |
| 5,171,060 A | 12/1992 | Kaye |
| 5,172,530 A | 12/1992 | Fishel et al. |
| 5,184,441 A | 2/1993 | Balfanz, Jr. |
| 5,204,149 A | 4/1993 | Phenicie et al. |
| 5,207,037 A | 5/1993 | Giles et al. |
| 5,218,799 A | 6/1993 | Appino |
| D337,003 S | 7/1993 | Rowland |
| 5,227,005 A | 7/1993 | Zodrow et al. |
| 5,247,773 A | 9/1993 | Weir |
| 5,301,484 A | 4/1994 | Jansson |
| 5,309,686 A | 5/1994 | Underwood et al. |
| 5,321,579 A | 6/1994 | Brown et al. |
| D348,786 S | 7/1994 | Tolleson et al. |
| 5,351,452 A | 10/1994 | Gates |
| 5,352,033 A | 10/1994 | Gresham et al. |
| 5,394,668 A | 3/1995 | Lim |
| 5,488,808 A | 2/1996 | Cahill et al. |
| D371,683 S | 7/1996 | Tolleson et al. |
| 5,544,593 A | 8/1996 | Canfield et al. |
| 5,592,794 A | 1/1997 | Tundaun |
| 5,598,674 A | 2/1997 | Lay |
| 5,600,926 A | 2/1997 | Ehrlich |
| 5,601,348 A | 2/1997 | Minkovski |
| 5,640,297 A | 6/1997 | Labaze |
| 5,642,593 A | 7/1997 | Shieh |
| 5,669,314 A | 9/1997 | Grant |
| 5,685,113 A | 11/1997 | Reuter et al. |
| 5,740,644 A | 4/1998 | Menchetti |
| 5,740,650 A | 4/1998 | Seiber et al. |
| 5,740,744 A | 4/1998 | Nashirozawa et al. |
| 5,746,035 A | 5/1998 | Seiber et al. |
| 5,778,612 A | 7/1998 | Kissinger et al. |
| 5,792,541 A | 8/1998 | Herrera |
| D397,880 S | 9/1998 | Saul |
| D398,464 S | 9/1998 | Cronk |
| 5,802,789 A | 9/1998 | Goodman et al. |
| 5,803,146 A | 9/1998 | Boon |
| 5,806,261 A | 9/1998 | Huebner et al. |
| 5,813,178 A | 9/1998 | Edwards |
| 5,820,991 A | 10/1998 | Cabo |
| 5,822,935 A | 10/1998 | Mitchell |
| 5,826,385 A | 10/1998 | Dykstra et al. |
| 5,836,121 A | 11/1998 | Hofman |
| 5,839,240 A | 11/1998 | Elsholz et al. |
| 5,852,904 A | 12/1998 | Yu et al. |
| 5,860,255 A | 1/1999 | Fishel |
| 5,864,997 A | 2/1999 | Kelly |
| 5,870,867 A | 2/1999 | Mitchell |
| 5,875,596 A | 3/1999 | Muller |
| 5,881,979 A | 3/1999 | Rozier et al. |
| 5,913,787 A | 6/1999 | Edwards |
| 5,931,429 A | 8/1999 | Hellwig et al. |
| 5,950,386 A | 9/1999 | Shipman et al. |
| 5,978,988 A | 11/1999 | Burchett |
| 6,000,180 A | 12/1999 | Goodman |
| 6,012,258 A | 1/2000 | Brown et al. |
| 6,029,418 A | 2/2000 | Wright |
| 6,047,508 A | 4/2000 | Goodman et al. |
| 6,058,667 A | 5/2000 | MacDonald et al. |
| 6,094,872 A | 8/2000 | Ward et al. |
| 6,112,472 A | 9/2000 | Van et al. |
| 6,122,871 A | 9/2000 | Russell et al. |
| 6,128,877 A | 10/2000 | Goodman et al. |
| 6,131,347 A | 10/2000 | Hornberger |
| 6,134,845 A | 10/2000 | Shipman et al. |
| 6,141,926 A | 11/2000 | Rossiter et al. |
| 6,158,179 A | 12/2000 | Ackerly et al. |
| 6,161,347 A | 12/2000 | Yu et al. |
| 6,189,270 B1 | 2/2001 | Jeffers et al. |
| 6,195,953 B1 | 3/2001 | Gitter et al. |

(56) References Cited

U.S. PATENT DOCUMENTS

| | | |
|---|---|---|
| 6,223,485 B1 | 5/2001 | Beck et al. |
| 6,250,020 B1 | 6/2001 | Shipman |
| 6,250,032 B1 | 6/2001 | Davis et al. |
| 6,260,321 B1 | 7/2001 | Rudduck |
| 6,282,854 B1 | 9/2001 | Vos et al. |
| 6,295,764 B1 | 10/2001 | Berridge et al. |
| 6,301,846 B1 | 10/2001 | Waalkes et al. |
| 6,311,441 B1 | 11/2001 | Beavers et al. |
| 6,330,773 B1 | 12/2001 | MacDonald et al. |
| 6,341,457 B1 | 1/2002 | Aerts et al. |
| 6,363,663 B1 | 4/2002 | Kane et al. |
| 6,367,215 B1 | 4/2002 | Laing |
| 6,393,782 B1 | 5/2002 | Berridge et al. |
| 6,393,783 B2 | 5/2002 | Emaus et al. |
| 6,397,533 B1 | 6/2002 | Hornberger et al. |
| 6,397,537 B2 | 6/2002 | Auer et al. |
| 6,415,567 B1 | 7/2002 | Mead et al. |
| 6,446,396 B1 | 9/2002 | Marangoni |
| 6,446,404 B1 | 9/2002 | Bassin |
| 6,481,168 B1 | 11/2002 | Hodges et al. |
| 6,484,465 B2 | 11/2002 | Higgins |
| 6,490,154 B2 | 12/2002 | Thompson |
| 6,497,075 B1 | 12/2002 | Schreiner et al. |
| 6,530,181 B1 | 3/2003 | Seiber et al. |
| 6,536,175 B2 | 3/2003 | Conterno |
| 6,557,310 B2 | 5/2003 | Marshall et al. |
| 6,571,855 B1 | 6/2003 | Goldsmith et al. |
| 6,581,344 B1 | 6/2003 | Niewiadomski et al. |
| 6,591,563 B2 | 7/2003 | King et al. |
| 6,612,077 B2 | 9/2003 | Parshad |
| 6,615,556 B2 | 9/2003 | Cates et al. |
| 6,619,008 B1 | 9/2003 | Shivak et al. |
| 6,658,805 B1 | 12/2003 | Yu et al. |
| 6,668,514 B2 | 12/2003 | Skov |
| D485,096 S | 1/2004 | Overthun et al. |
| 6,684,929 B2 | 2/2004 | MacDonald et al. |
| 6,688,056 B2 | 2/2004 | Von et al. |
| 6,701,677 B2 | 3/2004 | Gresham et al. |
| 6,711,871 B2 | 3/2004 | Beirise et al. |
| 6,729,085 B2 | 5/2004 | Newhouse et al. |
| 6,735,908 B2 | 5/2004 | Edwards |
| 6,748,710 B2 | 6/2004 | Gresham et al. |
| 6,761,004 B2 | 7/2004 | Anglin et al. |
| 6,775,953 B2 | 8/2004 | Burken et al. |
| 6,799,404 B2 | 10/2004 | Spransy |
| 6,807,776 B2 | 10/2004 | Gresham et al. |
| 6,820,388 B2 | 11/2004 | Newhouse et al. |
| 6,851,226 B2 | 2/2005 | MacGregor et al. |
| 6,865,853 B2 | 3/2005 | Burken et al. |
| 6,883,277 B2 | 4/2005 | Wiechecki et al. |
| 6,889,477 B1 | 5/2005 | Kottman |
| 6,920,727 B2 | 7/2005 | Yu et al. |
| 6,928,785 B2 | 8/2005 | Shipman et al. |
| 6,941,716 B2 | 9/2005 | Kottman |
| 6,944,993 B1 | 9/2005 | Jilk et al. |
| 6,951,085 B2 | 10/2005 | Hodges et al. |
| 6,964,138 B2 | 11/2005 | Carroll et al. |
| 6,981,454 B2 | 1/2006 | Burdick |
| 6,990,909 B2 | 1/2006 | Gosling et al. |
| 6,993,875 B2 | 2/2006 | Rudduck |
| 7,051,482 B2 | 5/2006 | MacDonald et al. |
| 7,150,127 B2 | 12/2006 | Underwood et al. |
| 7,210,270 B1 | 5/2007 | King et al. |
| 7,268,311 B2 | 9/2007 | Tanabe |
| 7,310,918 B1 | 12/2007 | Reuter et al. |
| 7,356,969 B1 * | 4/2008 | Yurth ................... E06B 9/24 |
| | | 359/614 |
| 7,434,790 B1 | 10/2008 | Hansen |
| 7,451,577 B2 | 11/2008 | Little, Jr. |
| 7,461,484 B2 | 12/2008 | Battey et al. |
| 7,540,115 B2 | 6/2009 | Metcalf et al. |
| 7,562,504 B2 | 7/2009 | Herbst et al. |
| 7,603,821 B2 | 10/2009 | Eberlein et al. |
| 7,644,552 B2 | 1/2010 | Kuipers et al. |
| 7,645,954 B2 | 1/2010 | Yasuda |
| 7,661,237 B2 | 2/2010 | Jakob-Bamberg et al. |
| 7,707,790 B2 | 5/2010 | Williams et al. |
| 7,818,932 B2 | 10/2010 | Eberlein et al. |
| 7,827,745 B2 | 11/2010 | Franceschet |
| 7,832,154 B2 | 11/2010 | Gosling et al. |
| 7,841,142 B2 | 11/2010 | Towersey et al. |
| 7,856,777 B2 | 12/2010 | Lamfers et al. |
| 7,861,474 B2 | 1/2011 | Houle et al. |
| 7,887,250 B1 | 2/2011 | Wang |
| 7,891,148 B2 | 2/2011 | Underwood et al. |
| 7,908,805 B2 | 3/2011 | Metcalf et al. |
| 7,913,459 B2 | 3/2011 | Ball et al. |
| 7,918,064 B2 | 4/2011 | Singleton |
| 7,922,224 B2 | 4/2011 | Arias |
| 7,984,598 B2 | 7/2011 | Gosling et al. |
| 8,015,766 B2 | 9/2011 | Gosling et al. |
| 8,015,767 B2 | 9/2011 | Glick et al. |
| 8,024,901 B2 | 9/2011 | Gosling et al. |
| 8,033,059 B2 | 10/2011 | Contois et al. |
| 8,033,068 B2 | 10/2011 | Luettmann et al. |
| 8,046,957 B2 | 11/2011 | Towersey et al. |
| 8,151,527 B2 | 4/2012 | Gosling et al. |
| 8,151,533 B2 | 4/2012 | Krieger |
| 8,176,707 B2 | 5/2012 | Gosling et al. |
| 8,215,061 B2 | 7/2012 | Gosling et al. |
| 8,272,180 B2 | 9/2012 | Glick et al. |
| 8,307,591 B2 | 11/2012 | Steinle et al. |
| 8,322,102 B2 | 12/2012 | Krieger |
| 8,393,122 B2 | 3/2013 | Henriott et al. |
| 8,474,193 B2 | 7/2013 | Sutton et al. |
| 8,479,026 B2 | 7/2013 | Lakshmanan et al. |
| 8,534,021 B2 | 9/2013 | Liu et al. |
| 8,601,749 B2 | 12/2013 | Von et al. |
| 8,613,168 B2 | 12/2013 | Von et al. |
| 8,615,936 B2 | 12/2013 | Von et al. |
| 8,646,739 B2 | 2/2014 | Moyer |
| 8,656,648 B2 | 2/2014 | Liegeois et al. |
| 8,683,745 B2 | 4/2014 | Artwohl et al. |
| 8,729,446 B2 | 5/2014 | Verfuerth |
| D710,025 S | 7/2014 | Johnson et al. |
| 8,910,435 B2 | 12/2014 | Feldpausch et al. |
| D725,638 S | 3/2015 | Hofman et al. |
| 8,966,839 B2 | 3/2015 | Rebman et al. |
| 9,003,731 B2 | 4/2015 | Gosling et al. |
| D731,833 S | 6/2015 | Fifield et al. |
| 9,084,489 B2 | 7/2015 | Gosling et al. |
| 9,206,600 B2 | 12/2015 | Von et al. |
| 9,284,729 B2 | 3/2016 | Von et al. |
| 9,562,354 B2 | 2/2017 | Strassle et al. |
| 9,673,851 B2 | 6/2017 | Pelster |
| 9,747,823 B2 | 8/2017 | Lorenzini |
| 10,016,056 B2 | 7/2018 | Sklansky |
| 2001/0039774 A1 | 11/2001 | Beirise et al. |
| 2002/0053174 A1 | 5/2002 | Barmak |
| 2002/0104271 A1 | 8/2002 | Gallant |
| 2002/0108330 A1 | 8/2002 | Yu et al. |
| 2002/0121056 A1 | 9/2002 | Von et al. |
| 2002/0124514 A1 | 9/2002 | Higgins |
| 2002/0129574 A1 | 9/2002 | Newhouse et al. |
| 2002/0144476 A1 | 10/2002 | Mastelli |
| 2002/0157335 A1 | 10/2002 | Vos |
| 2003/0005514 A1 | 1/2003 | Kunkel |
| 2003/0060080 A1 | 3/2003 | Rees |
| 2003/0089057 A1 | 5/2003 | Wiechecki et al. |
| 2003/0154673 A1 | 8/2003 | MacGregor et al. |
| 2003/0163967 A1 | 9/2003 | Sims |
| 2003/0193709 A1 * | 10/2003 | Mallya ............... G02F 1/13718 |
| | | 359/245 |
| 2003/0196388 A1 | 10/2003 | Edwards |
| 2003/0221384 A1 | 12/2003 | Burken et al. |
| 2004/0010998 A1 | 1/2004 | Turco |
| 2004/0020137 A1 | 2/2004 | Battey et al. |
| 2004/0035074 A1 | 2/2004 | Stanescu et al. |
| 2004/0045225 A1 | 3/2004 | Weiss |
| 2004/0093805 A1 | 5/2004 | Underwood et al. |
| 2004/0139677 A1 | 7/2004 | Mulas et al. |
| 2004/0177573 A1 | 9/2004 | Newhouse et al. |
| 2005/0005527 A1 | 1/2005 | Metcalf et al. |
| 2005/0086871 A1 | 4/2005 | MacGregor et al. |

(56) References Cited

U.S. PATENT DOCUMENTS

| | | |
|---|---|---|
| 2005/0204596 A1 | 9/2005 | Peng |
| 2006/0042141 A1 | 3/2006 | Hansen et al. |
| 2006/0048457 A1 | 3/2006 | Yang |
| 2006/0050063 A1 | 3/2006 | Tanabe |
| 2006/0052097 A1 | 3/2006 | Struthers |
| 2006/0059806 A1 | 3/2006 | Gosling et al. |
| 2006/0073272 A1 | 4/2006 | Carel |
| 2006/0080939 A1 | 4/2006 | Bledsoe |
| 2006/0097989 A1 | 5/2006 | Ho |
| 2006/0158805 A1* | 7/2006 | Malvino ............... E06B 9/24 |
| | | 361/62 |
| 2006/0185276 A1 | 8/2006 | Pai |
| 2006/0210755 A1 | 9/2006 | Blazek |
| 2007/0070192 A1 | 3/2007 | Shalam |
| 2007/0077387 A1 | 4/2007 | Riccobene |
| 2007/0242174 A1 | 10/2007 | Maisuradze et al. |
| 2007/0277449 A1 | 12/2007 | Burns |
| 2007/0289225 A1 | 12/2007 | Kern et al. |
| 2008/0069632 A1 | 3/2008 | Gosling et al. |
| 2008/0295426 A1 | 12/2008 | Milligan et al. |
| 2008/0302054 A1 | 12/2008 | Gosling et al. |
| 2009/0021122 A1 | 1/2009 | Green et al. |
| 2009/0160796 A1 | 6/2009 | Jiang |
| 2009/0174998 A1 | 7/2009 | Struthers |
| 2009/0241437 A1 | 10/2009 | Steinle et al. |
| 2009/0256040 A1 | 10/2009 | Lee |
| 2009/0260311 A1 | 10/2009 | Boyer et al. |
| 2009/0272056 A1 | 11/2009 | Koupal |
| 2009/0293406 A1 | 12/2009 | Gosling et al. |
| 2009/0324962 A1 | 12/2009 | Manetti |
| 2010/0002298 A1 | 1/2010 | Sugino et al. |
| 2010/0022998 A1 | 1/2010 | Sugino |
| 2010/0043142 A1 | 2/2010 | Whitford |
| 2010/0050548 A1 | 3/2010 | Krieger |
| 2010/0067969 A1 | 3/2010 | Kang |
| 2010/0102960 A1 | 4/2010 | Simon et al. |
| 2010/0138581 A1 | 6/2010 | Bird |
| 2010/0192511 A1 | 8/2010 | Gosling et al. |
| 2010/0223857 A1 | 9/2010 | Sutton et al. |
| 2010/0236173 A1 | 9/2010 | Pacha |
| 2010/0287858 A1 | 11/2010 | Israeli et al. |
| 2010/0307086 A1 | 12/2010 | Hibbs |
| 2011/0197519 A1 | 8/2011 | Henriott et al. |
| 2012/0033375 A1 | 2/2012 | Madonna |
| 2012/0102844 A1 | 5/2012 | Damo |
| 2012/0141735 A1 | 6/2012 | Chevallier |
| 2012/0176776 A1 | 7/2012 | Van Herpen et al. |
| 2012/0186164 A1 | 7/2012 | Pensi |
| 2012/0293855 A1 | 11/2012 | Shrivastava et al. |
| 2012/0317899 A1 | 12/2012 | Von et al. |
| 2013/0025220 A1 | 1/2013 | Yu et al. |
| 2013/0094168 A1 | 4/2013 | Jaeger |
| 2013/0157493 A1 | 6/2013 | Brown |
| 2013/0188105 A1* | 7/2013 | Dobrenko .......... G02F 1/133362 |
| | | 349/16 |
| 2014/0102021 A1 | 4/2014 | Gosling et al. |
| 2014/0133137 A1 | 5/2014 | Kiss |
| 2014/0137495 A1 | 5/2014 | Ariza |
| 2014/0157693 A1 | 6/2014 | Schumacher |
| 2014/0310873 A1 | 10/2014 | Gosling et al. |
| 2014/0338272 A1 | 11/2014 | Shiao |
| 2014/0362050 A1 | 12/2014 | Wilson |
| 2015/0007516 A1 | 1/2015 | Glick et al. |
| 2015/0027753 A1 | 1/2015 | Huang et al. |
| 2015/0029412 A1 | 1/2015 | Kishioka |
| 2015/0085439 A1 | 3/2015 | Lee |
| 2015/0118869 A1* | 4/2015 | Brown .................. H01R 25/14 |
| | | 439/39 |
| 2015/0343884 A1 | 12/2015 | Rousselet |
| 2015/0354212 A1 | 12/2015 | Von et al. |
| 2016/0007487 A1 | 1/2016 | Lee |
| 2016/0032644 A1 | 2/2016 | Geller et al. |
| 2016/0052241 A1 | 2/2016 | Zhang |
| 2016/0053485 A1 | 2/2016 | Von et al. |
| 2016/0071664 A1 | 3/2016 | Cohen |
| 2016/0168863 A1 | 6/2016 | Kwan et al. |
| 2016/0211878 A1 | 7/2016 | Pelster |
| 2016/0282983 A1 | 9/2016 | Chang et al. |
| 2016/0306384 A1 | 10/2016 | Carvey |
| 2016/0327300 A1 | 11/2016 | Ribbich |
| 2016/0348361 A1 | 12/2016 | Gosling et al. |
| 2016/0363143 A1 | 12/2016 | Druce |
| 2017/0038896 A1 | 2/2017 | Lee et al. |
| 2017/0089066 A1 | 3/2017 | Gosling et al. |
| 2017/0256927 A1 | 9/2017 | Padilla |
| 2017/0299911 A1* | 10/2017 | Woo .................. G02F 1/134309 |
| 2018/0002924 A1 | 1/2018 | Gosling |
| 2018/0195290 A1 | 7/2018 | Seffer et al. |
| 2018/0199451 A1 | 7/2018 | Van De Sype et al. |
| 2021/0246719 A1* | 8/2021 | Shrivastava ............. E06B 9/24 |

FOREIGN PATENT DOCUMENTS

| | | |
|---|---|---|
| CA | 2011977 A1 | 10/1990 |
| CA | 2040822 A1 | 11/1991 |
| CA | 1294107 C | 1/1992 |
| CA | 2002674 C | 3/1993 |
| CA | 2162300 A1 | 5/1997 |
| CA | 2248428 A1 | 3/2000 |
| CA | 2273631 C | 10/2001 |
| CA | 2324050 A1 | 4/2002 |
| CA | 2430163 A1 | 7/2002 |
| CA | 2359165 A1 | 4/2003 |
| CA | 2310869 C | 8/2003 |
| CA | 2476368 A1 | 1/2006 |
| CA | 2535213 A1 | 8/2006 |
| CA | 2428593 C | 8/2007 |
| CA | 2359547 C | 2/2008 |
| CA | 2348060 C | 7/2008 |
| CA | 2591176 A1 | 12/2008 |
| CA | 2634407 A1 | 12/2008 |
| CA | 2349964 C | 10/2009 |
| CA | 2840843 A1 | 12/2013 |
| CA | 2863783 A1 | 4/2014 |
| CH | 686795 A5 | 6/1996 |
| CN | 201197135 | 2/2009 |
| CN | 202069245 U | 12/2011 |
| DE | 1659015 A1 | 11/1971 |
| DE | 2941754 | 4/1981 |
| DE | 3900397 | 7/1990 |
| DE | 4207753 A1 | 9/1993 |
| DE | 9307530 | 9/1994 |
| DE | 29620551 | 3/1997 |
| DE | 69316247 T2 | 7/1998 |
| DE | 19960535 A1 | 6/2001 |
| DE | 202004017808 U1 | 1/2005 |
| DE | 202012103275 | 9/2012 |
| DE | 102012008969 | 11/2013 |
| EP | 0000913 | 3/1979 |
| EP | 0302564 A2 | 2/1989 |
| EP | 0378133 | 7/1990 |
| EP | 0443202 A1 | 8/1991 |
| EP | 0557092 A1 | 8/1993 |
| EP | 0657595 A1 | 6/1995 |
| EP | 0886016 A1 | 12/1998 |
| EP | 0963719 A2 | 12/1999 |
| EP | 1035264 A1 | 9/2000 |
| EP | 1094167 A2 | 4/2001 |
| EP | 1526637 A1 | 4/2005 |
| EP | 2273348 | 1/2011 |
| EP | 2730892 | 5/2014 |
| EP | 2736382 A1 | 6/2014 |
| FR | 1526637 A | 5/1968 |
| FR | 2218447 A1 | 9/1974 |
| FR | 2499352 | 8/1982 |
| GB | 1013451 A | 12/1965 |
| GB | 1259347 A | 1/1972 |
| GB | 1400613 A | 7/1975 |
| GB | 2221946 A | 2/1990 |
| GB | 2283071 A | 4/1995 |
| GB | 2323780 | 7/1998 |
| GB | 2353541 A | 2/2001 |
| GB | 2374612 A | 10/2002 |
| JP | 03-017333 A | 1/1991 |

(56) References Cited

FOREIGN PATENT DOCUMENTS

| | | |
|---|---|---|
| JP | 2003-105908 A | 4/2003 |
| JP | 2005-155223 A | 6/2005 |
| KR | 10-2000-0049102 A | 7/2000 |
| KR | 10-2007-0077502 A | 7/2007 |
| KR | 1020120040541 | 4/2012 |
| KR | 10-1311065 B1 | 9/2013 |
| KR | 10-1311068 B1 | 9/2013 |
| WO | 92/12074 A2 | 7/1992 |
| WO | 92/12300 A1 | 7/1992 |
| WO | 93/15970 A1 | 8/1993 |
| WO | 93/23629 A1 | 11/1993 |
| WO | 94/02695 A1 | 2/1994 |
| WO | 9626336 | 8/1996 |
| WO | 96/33323 A1 | 10/1996 |
| WO | 97/46770 A1 | 12/1997 |
| WO | 98/07357 A1 | 2/1998 |
| WO | 98/16699 A1 | 4/1998 |
| WO | 9816870 | 4/1998 |
| WO | 98/29623 A1 | 7/1998 |
| WO | 98/37292 A1 | 8/1998 |
| WO | 98/51876 A1 | 11/1998 |
| WO | 99/46453 A2 | 9/1999 |
| WO | 99/46455 A2 | 9/1999 |
| WO | 99/46458 A1 | 9/1999 |
| WO | 99/53156 A1 | 10/1999 |
| WO | 99/58780 A1 | 11/1999 |
| WO | 99/63177 A1 | 12/1999 |
| WO | 00/15918 A1 | 3/2000 |
| WO | 00/75440 A1 | 12/2000 |
| WO | 00/75447 A1 | 12/2000 |
| WO | 01/71241 A1 | 9/2001 |
| WO | 02/08851 A2 | 1/2002 |
| WO | 02/52111 A1 | 7/2002 |
| WO | 2002/103129 A1 | 12/2002 |
| WO | 03/71045 A2 | 8/2003 |
| WO | 2003/104581 A2 | 12/2003 |
| WO | 2004114105 | 12/2004 |
| WO | 2006/005968 A1 | 1/2006 |
| WO | 2006/127804 A2 | 11/2006 |
| WO | 2006123335 | 11/2006 |
| WO | 2009109538 | 9/2009 |
| WO | 2010/121788 A1 | 10/2010 |
| WO | 2011096580 | 8/2011 |
| WO | 2011/150467 A1 | 12/2011 |
| WO | 2012/173930 A2 | 12/2012 |
| WO | 2013/101298 A1 | 7/2013 |
| WO | 2013/130871 A1 | 9/2013 |
| WO | 2013/185141 A1 | 12/2013 |
| WO | 2013/188211 A1 | 12/2013 |
| WO | 2013/188235 A1 | 12/2013 |
| WO | 2014/039278 A2 | 3/2014 |
| WO | 2014/055883 A1 | 4/2014 |
| WO | 2014132715 | 9/2014 |
| WO | 2015017198 | 2/2015 |
| WO | 2016/059244 A1 | 4/2016 |
| WO | 2016059224 | 4/2016 |
| WO | 2016/149362 A1 | 9/2016 |
| WO | 20170213960 | 12/2017 |
| WO | 2018009936 | 1/2018 |

OTHER PUBLICATIONS

Office Action for U.S. Appl. No. 14/032,931 dated Jul. 16, 2015.
Office Action for U.S. Appl. No. 14/681,874 dated Jul. 23, 2015.
Office Insight, [Publication Date Unlisted], dated Mar. 23, 2009.
Patent Owner's Preliminary Response for Case No. IPR2015-01690 dated Nov. 13, 2015.
Patent Owner's Preliminary Response for Case No. IPR2015-01691 dated Nov. 18, 2015.
Patent Owners Response (IPR2015-01691), *Allsteel* v. *DIRTT Environmental Solutions*, dated May 2, 2016.
Patent Owners Response to Petitioners Supplemental Brief Addressing Newly Instituted Claims 8,11,13, and 21-23 IPR2015-01691), *Allsteel* v. *DIRTT Environmental Solutions*, dated Nov. 28, 2018.
Petition for Inter Partes Review of U.S. Pat. No. 8,024,901, IPR2015-01690, filed Aug. 7, 2015.
Petition for Inter Partes Review of U.S. Pat. No. 8,024,901, IPR2015-01691, filed Aug. 7, 2015.
Petitioners Reply to Patent Owners Responsive Brief (IPR2015-01691), *Allsteel* v. *DIRTT Environmental Solutions*, dated Dec. 12, 2018.
Petitioners Supplemental Brief Addressing Newly Instituted Claims 8,11,13 and 21-23 (IPR2015-01691), *Allsteel* v. *DIRTI Environmental Solutions*, dated Oct. 19, 2018.
Press Release~"KI unveils Genius Full Heigth Movable Wall Microsite with new interactive features", Accessed on Aug. 14, 2015 at http://web.archive.org/web/20040506230219/http://www.ki.com/about_press_release.asp?id=49.
Reply Declaration of Joseph J. Beaman, Jr., Exhibit No. 1032 (IPR2015-01691), *Allsteel* v. *DIRTT Environmental Solutions*, dated Jul. 21, 2016.
Reply to Patent Owners Response (IPR2015-01691), *Allsteel* v. *DIRTI Environmental Solutions*, dated Jul. 21, 2016.
Restriction Requirement for U.S. Appl. No. 14/683,684 dated Oct. 5, 2017.
Singapore Supplementary Examination Report received for Singapore Patent Application No. 11201606345U, dated Dec. 4, 2020, 2 pages.
SMED International—Lifespace—Technical Information, [Publication Date Unlisted], Dated Jan. 1, 1996.
Supplemental Declaration of Joseph J. Beaman Jr. (IPR2015-01691), *Allsteel* v. *DIRTT Environmental Solutions*, dated Oct. 19, 2018.
Supplementary European Search Report for application EP 15752752 dated Nov. 30, 2017.
Supplementary Search Report for application EP 15751602 dated Nov. 21, 2017.
Supplementary Search Report for application EP 15804050 dated Nov. 30, 2017.
Teknionaltos—Price and Product Guide Update, [Publication Date Unlisted], Dated Feb. 2002.
U.S. Specifier Guide and Price Book, [Publication Date Unlisted], Dated Jan. 1998.
Office Action received for European Patent Application No. 16765651.1, dated Feb. 15, 2021, 5 pages.
Notice of Allowance received for U.S. Appl. No. 15/741,489, dated Apr. 14, 2021, 8 pages.
Notice of Allowance received for U.S. Appl. No. 15/741,489, dated Apr. 29, 2021, 2 pages.
Notice of Allowance received for U.S. Appl. No. 15/741,489, dated Jun. 9, 2021, 2 pages.
Notice of Allowance received for U.S. Appl. No. 15/741,489, dated May 27, 2021, 2 pages.
Office Action received for European Patent Application No. 17810747, dated Apr. 30, 2021, 6 pages.
Written Opinion for Singapore Application No. 11201800368R dated Feb. 25, 2020.
Non-Final Office Action received for U.S. Appl. No. 15/741,489, dated Oct. 27, 2020, 7 pages.
International Search Report and Written Opinion received for PCT Patent Application No. PCT/US2017/035520, dated Aug. 18, 2017, 14 pages.
Supplementary European Search Report and Search Opinion Received for EP Application No. 17810747, dated Mar. 29, 2019, 6 pages.
Achieving the Atkins Aesthetic: KI's new ThinLine option for its award-winning Genius Architectural Wall flaunts a slimmer figure, [Publication Date Unlisted], Dated Jun. 14, 2004.
Canadian Office Action for Application No. 2,800,414 dated Jul. 15, 2015.
Decision Denying Institution (IPR2015-01690), *Allsteal* v. *DIRTT Environmental Solutions* dated Jan. 27, 2016.
Decision Granting Institution (IPR2015-01691), *Allsteal* v. *DIRTT Environmental Solutions* dated Feb. 2, 2016.
Declaration of Robert Witti, Exhibit No. 1033 (IPR2015-01691), *Allsteel* v. *DIRTT Environmental Solutions*, dated Jul. 21, 2016.

(56) References Cited

OTHER PUBLICATIONS

Deposition of Joseph J. Beaman, Jr., Exhibit No. 2003 (IPR2015-01691), *Allsteel v. DIRTT Environmental Solutions*, dated Apr. 1, 2016.
European Communication pursuant to Article 94(3) EPC for European Application No. 15751602.2, dated Jul. 7, 2020, 4 pages.
European Communication pursuant to Article 94(3) EPC for European Application No. 15752109.7, dated Jul. 7, 2020, 5 pages.
European Communication pursuant to Article 94(3) EPC for European Application No. 15752752.4, dated Jul. 7, 2020, 4 pages.
European Communication pursuant to Article 94(3) EPC received for European Patent Application No. 15804050.1, dated Jul. 16, 2020, 5 pages.
European Search Report and Search Opinion Received for EP Application No. 15804050.1, dated Dec. 11, 2017, 7 pages.
European Search Report for PCT/US2012/042314 dated Jan. 29, 2015.
European Search Report for PCT/US2015015943, dated Sep. 27, 2017.
European Supplementary Search Report and Opinion for European Application No. 15751602.2, dated Dec. 11, 2017, 7 pages.
European Supplementary Search Report and Opinion for European Application No. 15752109.7, dated Sep. 27, 2017, 8 pages.
European Supplementary Search Report and Opinion for European Application No. 15752752.4, dated Dec. 11, 2017, 6 pages.
Ex Parte Quayle Action received for U.S. Appl. No. 14/032,931, dated Jul. 24, 2020, 6 pages.
Exhibit 2010 Oral Deposition of Joseph J. Beaman Jr., Ph.D. (IPR2015-01691), *Allsteel v. DIRTI Environmental Solutions*, dated Nov. 18, 2018.
Expert Declaration of Joseph J. Beaman, Jr., Exhibit No. 1018 (IPR2015-01691), *Allsteel v. DIRTT Environmental Solutions*, dated Aug. 5, 2015.
Final Office Action for U.S. Appl. No. 14/657,837 dated Nov. 2, 2015.
Final Office Action for U.S. Appl. No. 15/023,990 dated Sep. 7, 2018.
Final Office Action for U.S. Appl. No. 15/023,990 dated Oct. 3, 2017.
Final Office Action for U.S. Appl. No. 14/681,874 dated Apr. 15, 2016.
Final Written Decision (IPR2015-01691), *Allsteal v. DIRTT Environmental Solutions* dated Jan. 19, 2017.
Final Written Decision on Remand (IPR2015-01691), *Allsteel v. DIRTT Environmental Solutions*, dated Apr. 22, 2019.
Genius Architectural Walls, [Publication Date Unlisted], Copyright Date 2004 by KI, Document Code KI-00473/HC/IT/PP/504.
International Search Report and Written Opinion for PCT/US2012/041906 dated Jan. 31, 2013.
International Search Report and Written Opinion for PCT/US2012/042314 dated Jun. 13, 2012.
International Search Report for application No. PCT/US15/015931 dated Apr. 30, 2015.
International Search Report for application No. PCT/US15/015943 dated May 14, 2015.
International Search Report for application No. PCT/US15/15920 dated May 22, 2015.
International Search Report for application No. PCT/US15/34491 dated Sep. 15, 2015.
KI Genius Full-Height Moveable Walls, [Publication Date Unlisted], Copyright Date 2003 by KI, Document Code KI-00506/HC/PP/803.
KI Improves STC Rating on its Genius Architectural Wall and receives ICC approval, [Publication Date Unlisted], dated Feb. 26, 2004.
Lifespace Environmental Wall Systems, [Publication Date Unlisted], Dated Apr. 1995.
Non-Final Office Action for U.S. Appl. No. 14/305,819, dated Jul. 11, 2017.
Non-Final Office Action for U.S. Appl. No. 14/681,874, dated Jun. 15, 2016.
Non-Final Office Action for U.S. Appl. No. 14/683,684 dated Apr. 23, 2018.
Non-Final Office Action for U.S. Appl. No. 15/023,990 dated Mar. 15, 2018.
Non-Final Office Action for U.S. Appl. No. 15/023,990 dated Mar. 6, 2017.
Non-Final Office Action for U.S. Appl. No. 15/177,084 dated Jan. 29, 2018.
Non-Final Office Action for U.S. Appl. No. 15/026,566 dated Sep. 21, 2017.
Non-Final Office Action in U.S. Appl. No. 14/903,035 dated Feb. 16, 2017.
Non-Final Office Action received for U.S. Appl. No. 15/026,566, dated Sep. 21, 2020, 15 pages.
Notice of Allowance for U.S. Appl. No. 29/492,776 dated Jan. 21, 2016.
Notice of Allowance for U.S. Appl. No. 29/493,280 dated Jan. 21, 2016.
Notice of Allowance for U.S. Appl. No. 14/657,837, dated Apr. 12, 2016.
Notice of Allowance for U.S. Appl. No. 14/683,684 dated Jan. 24, 2020.
Notice of Allowance for U.S. Appl. No. 14/903,035 dated Aug. 14, 2017.
Notice of Allowance for U.S. Appl. No. 15/028,000, dated Jul. 7, 2017.
European Search Report received for EP Patent Application No. 17825076.7, dated Feb. 10, 2020, 4 pages.
Office Action received for Canada Patent Application No. 2978206, dated Feb. 22, 2022, 4 pages.
Office Action received for European Patent Application No. 17825076.7, dated Mar. 15, 2022, 5 pages.
Office Action received for European Application No. 17810747, dated May 19, 2022, 5 pages.
International Search Report and Written Opinion for application No. PCT/US2016/022634 dated Jun. 26, 2016.
International Search Report on Patentability Chapter I for application No. PCT/US2016/022634 dated Sep. 19, 2017.
International Search Report and Written Opinion for application No. PCT/US2017/041387 dated Oct. 19, 2017.
International Search Report and Written Opinion for application No. PCT/US2017/035520 dated Aug. 18, 2017.
Non-Final Office Action for U.S. Appl. No. 15/038,694 dated Jan. 18, 2018.
Second Search Report and Written Opinion for application No. 11201606345U dated Feb. 13, 2018.
Non-Final Office Action for U.S. Appl. No. 15/741,180 dated Oct. 5, 2018.
European Search Report and Written Opinion for application No. PCT/US2016022634 dated Oct. 23, 2018.
Final Office Action for U.S. Appl. No. 15/741,180, dated Feb. 21, 2019.
Office Action for U.S. Appl. No. 15/741,180, dated May 9, 2019.
European Office Action for application No. 16765651.1-1002 dated Aug. 8, 2019.
Final Office Action for U.S. Appl. No. 15/741,180 dated Jan. 23, 2020.

\* cited by examiner

LOW-VOLTAGE SMART GLASS

BACKGROUND

Innovative building materials provide several benefits within modern architectural design. For example, innovative insulation products have increased thermal efficiency of buildings and, in some cases, increased sound insulating properties between rooms. Similarly, technological advances in lighting technology have significantly increased the life of light bulbs, while at the same time dramatically decreasing the power requirements of the light bulbs.

Some advances in building technology address both aesthetic and functional aspects within architectural design. For example, smart glass is a glass material or film that is switchable between a transparent state and an opaque state. Smart glass provides the ability to let natural light enter a room in a transparent state or to increase privacy within a room by exhibiting an opaque state. Similarly, smart glass can be used to increase the power efficiency of a building by adjusting opacity based upon temperature and sun location. For example, an exterior smart glass window may remain transparent when the temperature within a building is cooler than desired. The transparent window allows sunlight to naturally heat up the air within the building. Once a desired temperature is achieved, the smart glass window increases the opacity of the window causing excess light and heat from the sun to be blocked.

While smart glass is associated with several significant design improvements, it is also associated with potential dangers and difficulties. For example, a smart glass window necessarily is associated with a voltage applied to the glass or a film on the glass. The voltage increases the risk of inadvertent electrocution if the glass is damaged or becomes wet. Additionally, routing electric cables to smart glass windows is both cumbersome and expensive. Accordingly, there are several problems within the conventional art that need to be addressed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein include modular wall systems, smart glass controllers and methods for operating such. In one embodiment, a modular wall system is provided which includes a frame with at least one horizontal stringer extending from a first side of the frame to a second side of the frame. The modular wall system also includes first connectors positioned on a horizontal stringer and a decorative smart glass pane which itself includes second connectors configured to attach to the first connectors on the horizontal stringer. The second connectors and the first connectors physically attach the decorative smart glass pane to the modular wall system.

A power connector is also included in the modular wall system. The power connector is configured to receive a direct current (DC) input voltage from a power source. A power inverter converts the DC input voltage to an alternating current (AC) voltage of less than a threshold maximum number of volts. Furthermore, a smart glass surface is included in the system. The smart glass surface is in communication with an output of the inverter, and is operable at a voltage less than the threshold maximum.

In another embodiment, a smart glass controller is provided. The smart glass controller includes a structural platform configured to interconnect various smart glass controller components. An inverter is disposed on the structural platform and is configured to convert a direct current (DC) input voltage to an output alternating current (AC) voltage. The smart glass controller further includes a smart glass surface in communication with the output AC voltage.

The smart glass surface has an associated opacity level, and is operable at less than a threshold maximum voltage. The opacity level of the smart glass surface is adjustable according to the frequency of the AC voltage. The smart glass controller also includes a control device in communication with the inverter and the smart glass surface. The control device allows the frequency of the AC voltage to be adjusted and thereby control the opacity of the smart glass.

In another embodiment, a method for controlling opacity in a smart glass surface is provided. The method includes interconnecting smart glass controller components to a structural platform, converting a DC input voltage to an output AC voltage using an inverter disposed on the structural platform, initializing a control device in communication with the inverter and the smart glass surface, where the control device is configured to change the frequency of the AC voltage and thereby control the opacity of the smart glass surface, receiving an input indicating a desired opacity level for the smart glass surface, and adjusting the frequency of the AC voltage such that the smart glass surface reaches the desired opacity level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein include modular wall systems, smart glass controllers and methods for operating such. In one embodiment, a modular wall system is provided which includes a frame with at least one horizontal stringer extending from a first side of the frame to a second side of the frame. The modular wall system also includes first connectors positioned on a horizontal stringer and a decorative smart glass pane which itself includes second connectors configured to attach to the first connectors on the horizontal stringer. The second connectors and the first connectors physically attach the decorative smart glass pane to the modular wall system.

A power connector is also included in the modular wall system. The power connector is configured to receive a direct current (DC) input voltage from a power source. A power inverter converts the DC input voltage to an alternating current (AC) voltage of less than a threshold maximum number of volts. Furthermore, a smart glass surface is included in the system. The smart glass surface is in communication with an output of the inverter, and is operable at a voltage less than the threshold maximum.

In another embodiment, a smart glass controller is provided. The smart glass controller includes a structural platform configured to interconnect various smart glass controller components. An inverter is disposed on the structural platform and is configured to convert a direct current (DC) input voltage to an output alternating current (AC) voltage. The smart glass controller further includes a smart glass surface in communication with the output AC voltage.

The smart glass surface has an associated opacity level, and is operable at less than a threshold maximum voltage. The opacity level of the smart glass surface is adjustable according to the frequency of the AC voltage. The smart glass controller also includes a control device in communication with the inverter and the smart glass surface. The control device allows the frequency of the AC voltage to be adjusted and thereby control the opacity of the smart glass.

In another embodiment, a method for controlling opacity in a smart glass surface is provided. The method includes interconnecting smart glass controller components to a structural platform, converting a DC input voltage to an output AC voltage using an inverter disposed on the structural platform, initializing a control device in communication with the inverter and the smart glass surface, where the control device is configured to change the frequency of the AC voltage and thereby control the opacity of the smart glass surface, receiving an input indicating a desired opacity level for the smart glass surface, and adjusting the frequency of the AC voltage such that the smart glass surface reaches the desired opacity level.

Systems and apparatuses disclosed herein include control circuitry for smart glass installations. In at least one embodiment, the control circuitry and smart glass are integrated into a modular wall system. For example, the smart glass may comprise a portion of a decorative panel mounted to a modular wall frame. The smart glass is configurable to switch between a transparent and an opaque state based upon a voltage that is applied to the smart glass.

In at least one embodiment, the control circuitry comprises a power supply that is specially configured to operate at lower voltage levels than conventional smart glass power supplies. For example, in at least one embodiment, the smart glass is driven by a power supply that ranges from 6V to 32V DC. The power supply may be located within a modular wall system and may be plugged into the smart glass control circuit. The control circuit comprises an inverter that is configured to convert the input DC voltage to an output AC voltage of less than 60V. In at least one embodiment, the inverter outputs less than 24V AC.

In various additional or alternative embodiments, the lower voltage level provides significant technological and usage benefits. For example, the lower voltage level provides increased safety in the case of a broken smart glass pane or an inadvertently exposed wire. Similarly, lower voltage provides for easier installation because less certifications and safety precautions are required when dealing with low voltage components. Accordingly, disclosed embodiments provide various advances to smart glass installations within modular wall systems.

Figure 1:
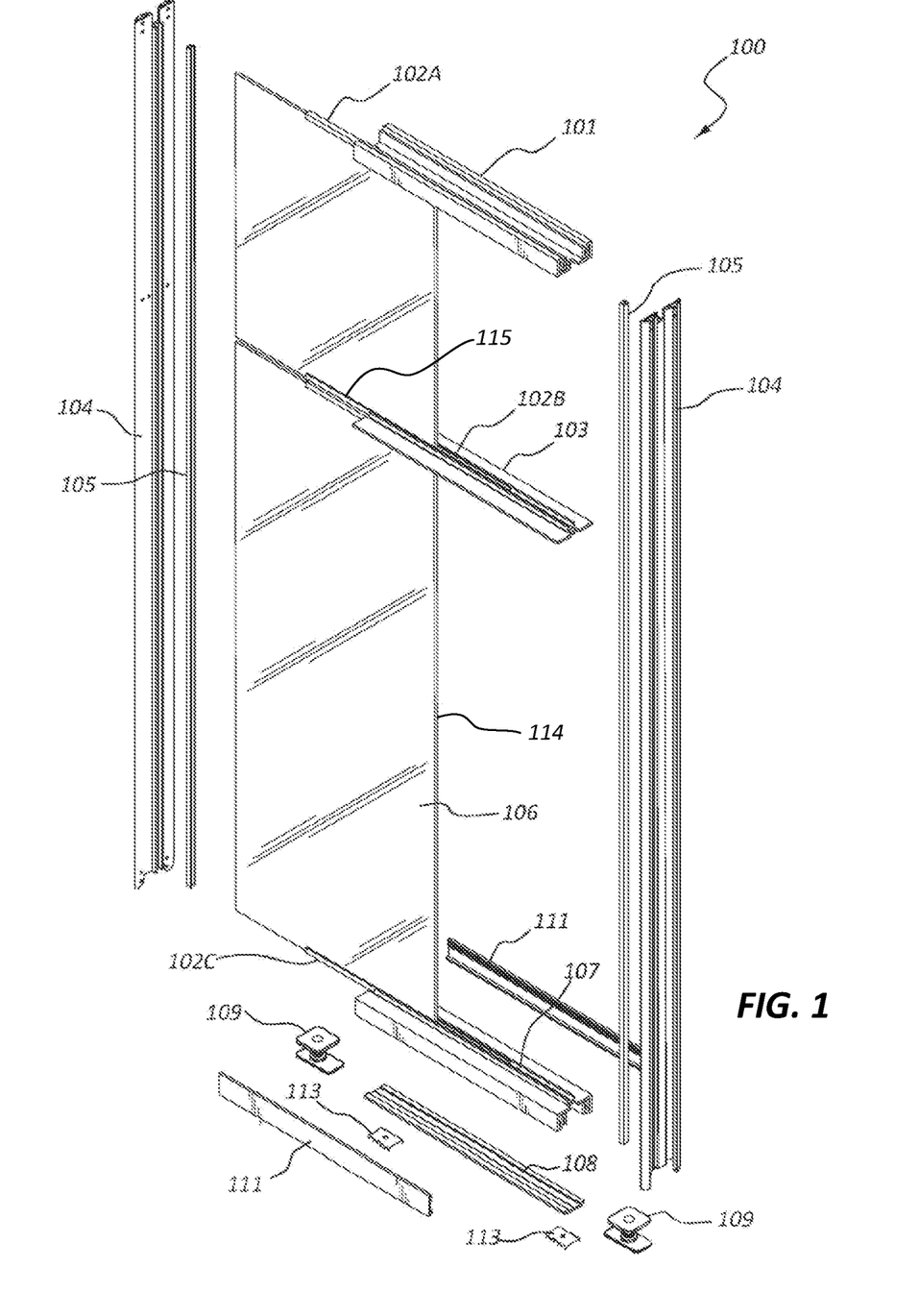
FIG. 1 depicts an exploded view of an embodiment of a low-voltage power supply for a smart glass wall panel.
Figure 3:
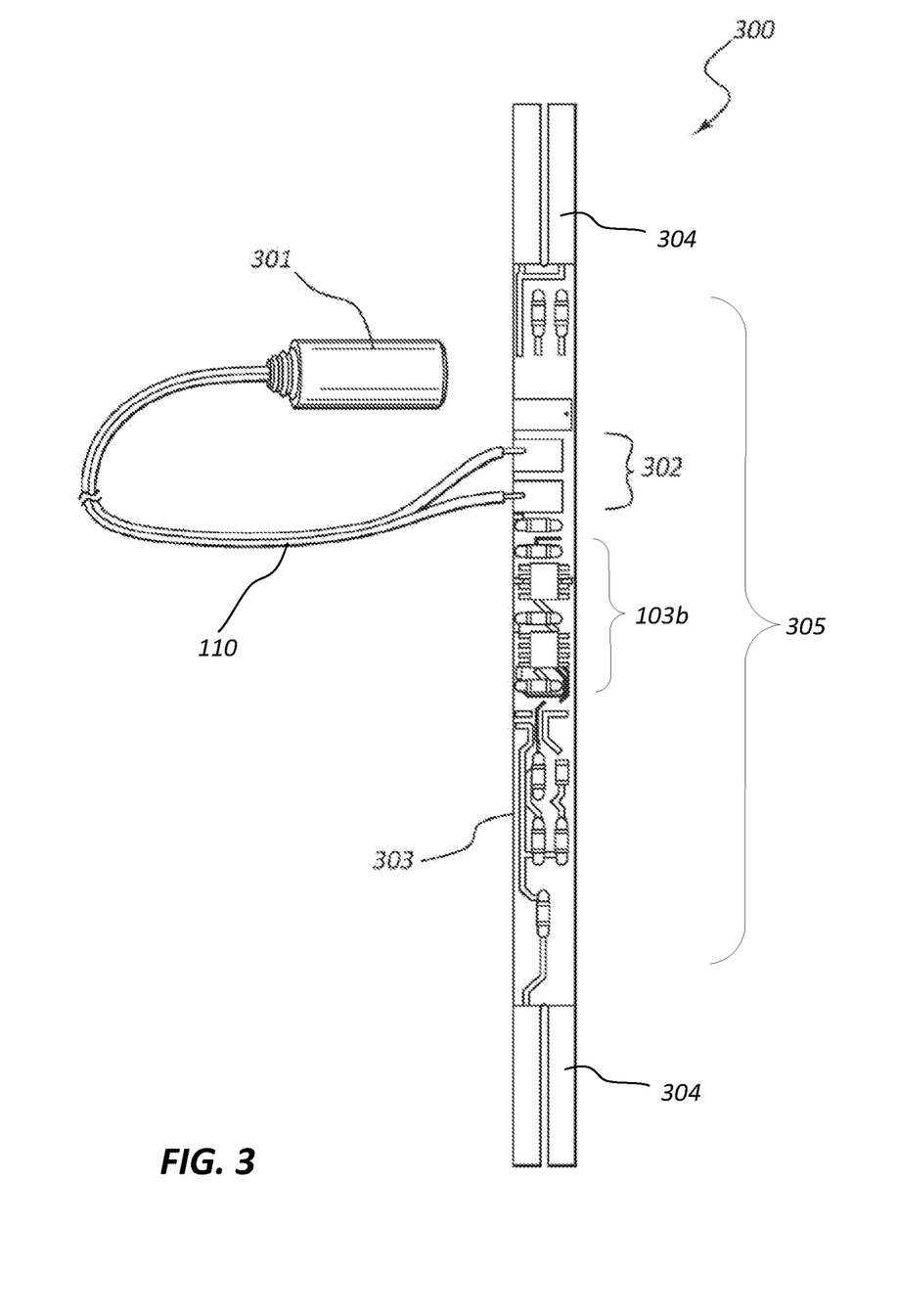
FIG. 3 depicts a top view of a smart glass controller that is installable in a modular wall system.

Turning now to the figures, FIG. 1 illustrates an embodiment of a low voltage power supply 112 for a smart glass wall panel 100. The low voltage power supply 112 may be included within a portion of the smart glass control circuit (see FIGS. 3 and 5). The depicted low voltage power supply 112 includes power supply lines 110 and various control circuitry (see FIG. 4) that is configured to drive the smart glass wall panel 100.

The power supply lines 110 include respective positive and negative power lines that provide power directly from a power outlet or from a transformer that is connected to a power outlet. In the case that the power supply lines 110 connect directly to an outlet, the low voltage power supply 112 may include an integrated transformer that steps down the input voltage to a voltage of less than 60V AC. In the case that the power supply lines 110 are received from a transformer, the input voltage may comprise a voltage ranging from 6V DC to 32V DC.

The control circuitry may comprise micro controllers, or other processing units, that are configured to control various aspects of the voltage that is applied to the smart glass 106. For example, a control circuit may be a micro controller that adjusts the oscillation frequency of the voltage that is applied to the smart glass 106. In at least one embodiment, the AC voltage is applied to the smart glass 106 at a frequency of 50 Hz. Various experiments and tests have shown that particular ranges of frequencies perform better than others. For instance, some frequencies at voltage levels less than 60V may cause the smart glass to flicker as opposed to maintaining a steady transparent or opaque state. To avoid undesirable flicking, control circuitry includes a controller that allows a user to adjust the input. The input may allow the user to tune the frequency of the AC voltage. For instance, after installing the smart glasses within a modular wall, the user may adjust the frequency of the AC voltage using the input in order to eliminate flickering and/or change the opacity of the smart glass from a transparent state to an opaque state, or vice versa.

Similarly, in at least one embodiment, control circuit may include a micro controller for controlling the output voltage at the smart glass 106. For instance, as additional loads are put onto a power supply, input current and voltage may change. In order to maintain safe voltage operating parameters, it may be necessary for the control circuit to adjust characteristics of the low voltage power supply 112 such that the voltage at the smart glass 106 does not exceed the desired output. For example, control circuit may adjust the low voltage power supply 112 to maintain an output voltage of 24V plus or minus one volt. Similarly, the control circuit 130b may control the voltage output by enforcing a ceiling, such that the voltage is prevented from exceeding 24V.

As depicted, in at least one embodiment, the low voltage power supply 112 is physically manufactured on a circuit that is substantially the same width as a smart glass pane and is elongated to stretch along at least a portion of a pane edge. Additionally, the power supply lines 110 may be configured to attach to at least a portion of the pane edges adjacent to the low voltage power supply 112.

The described and depicted circuitry configuration allows for easy and safe installation of a decorative smart glass pane 114 within a modular wall system. For example, positioning the low voltage power supply 112 and power supply lines 110 along an edge of the smart glass pane allows a user to easily attach (or detach) the decorative smart glass pane to a modular wall system without damaging the circuitry. Additionally, positioning the low voltage power supply 112 along an edge of a smart glass pane allows the power supply lines 110 to connect to power lines that run along frame elements in the modular wall system.

As such, disclosed embodiments allow a smart glass pane 114 and a low voltage power supply 112 to be treated as a unitary component within a modular wall system. Installing the smart glass pane 114 only requires plugging the integrated low voltage power supply 112 into a power line within the modular wall system and then attaching the smart glass pane to a frame including end frames 101 and 107, horizontal stringer 103, and side frames 104) within the modular wall system 100. The installation process can be safely and quickly performed without the use of special electrical protection or inspection. The low voltage power supply 112 for the smart glass wall panel may include various modules, capacitors, diodes, and other circuit components for providing desired voltage levels, current levels, and frequencies to the smart glass pane 114. While the depicted circuit schematic comprises specific values and discrete component-types, one of skill in the art will understand that different types and values of discrete circuit components can be equivalently used.

In at least one embodiment, the low voltage power supply 112 comprises an inverter that is configured to receive an input voltage ranging from 6V to 24V. Similarly, the inverter is configured to output, to the smart glass, a voltage of less than 60V. In particular, in at least one embodiment, the output voltage is less than 24V. Additionally, the low voltage power supply 112 comprises circuitry for controlling the frequency of the output voltage, as described above.

Figure 2:
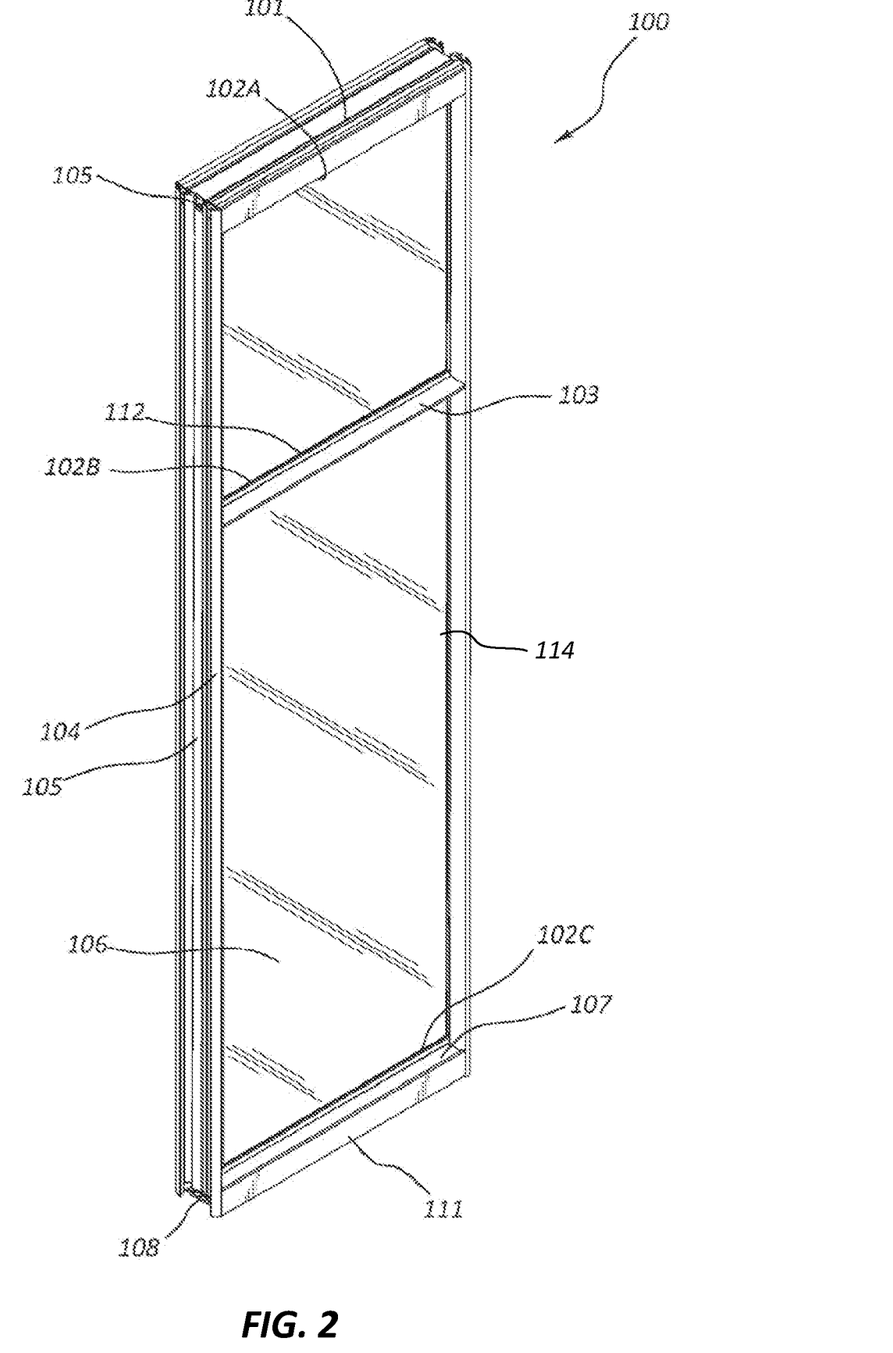
FIG. 2 depicts an assembled view of an embodiment of a low-voltage power supply for a smart glass wall panel.

In general, FIG. 1 depicts an exploded view of a modular wall system 100 with a smart glass pane 114, while FIG. 2 depicts an assembled view of the modular wall system 100. The modular wall system 100 comprises smart glass panes (e.g. 114) positioned between two horizontal end frames 101 and 107. Additionally, a horizontal stringer (e.g. 103) may extend between two vertical side frames (e.g. 104). The horizontal stringers or frames also hold edges of the smart glass pane 114. In at least one embodiment, the horizontal edge frames comprise one or more connectors (e.g., 102A, 102B, and 102C) in the form of a channel that extends along at least a portion of the length the horizontal edge frame and that is configured to receive an edge of a smart glass pane 114. Similarly, an edge of the smart glass pane 114 may also be a connector that is configured to be inserted into the crevasse within horizontal edge frames.

A power line 110 runs vertically along an edge of the two vertical end frames 104. The power line also runs along a horizontal stringer 103 and connects to the low voltage power supply 112 that is positioned along the edge of the smart glass pane 114. An electrical interface 115 on connector 102B connects the power line in the vertical end frame to the power line in the horizontal stringer 103. As such, the smart glass pane 114 can be easier removed from the modular wall system 100 and placed in a different position. In particular, removing or adding a smart glass pane 114 to the modular wall system only requires removing the smart glass pane and associated low voltage power supply 112. The smart glass pane 114 may be attached to another horizontal stringer with an integrated power line. The power line can be connected to the low voltage power supply 100 and the smart panel can be activated.

Accordingly, in various embodiments, the smart glass can be added to or removed from a modular wall system using an integrated low voltage power supply. The low voltage power supply allows smart glass panes 114 to be easily and safely removed from and reinstalled in a modular wall system without requiring special inspecting or configuration of high-voltage power lines.

The embodiments described herein may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

One embodiment of a modular wall system 100 includes a frame that has at least one horizontal stringer 103 extending from a first side of the frame to a second side of the frame. The horizontal stringer may divide various sections of the modular wall system. For instance, some sections may have smart glass that can change between being transparent and opaque, and other sections may have normal (i.e. non-smart) glass. The horizontal stringers may be part of the frame 101 or may be separate supporting structures that divide the various sections.

The modular wall system 100 also includes the electrical interface 115 on connector 102B positioned on at least one horizontal stringer that will allow power from corresponding connectors to reach the smart glass pane 114. Indeed, the decorative smart glass pane 114 may have one or more electrical interfaces (e.g. 304 of FIG. 4) that attach to the connectors 102B on the horizontal stringer 103. These electrical interfaces 115 and 304 may both physically and electrically attach the decorative smart glass pane to the modular wall system 100. A power connector 301 may be provided which receives a direct current (DC) input voltage from a power source (e.g. a wall power outlet), and a power inverter 302 converts the DC input voltage to an alternating current (AC) voltage of less than a threshold maximum number of volts (e.g. 32 volts). This AC voltage is then provided to the smart glass surface 106, which is operable at a voltage less than the threshold maximum.

The frame 101 may be a free-standing frame, and may include vertical and horizontal frame sections (102A and 104, respectively). Each frame section may have supports 105 that abut the glass panel 114 and hold the panel in place relative to the frame 101. Other, potentially optional equipment such as a leveler assembly 109, a carpet gripper piece 113, a base track 108 and a base trim piece 111 may also be included in the modular wall system 100. The modular wall system 100 receives power via a power line 110 from a power source, which then goes to a low voltage power supply 112 that is part of the circuitry 302 that powers and controls the smart glass. This circuitry may include microcontrollers 303 or other (potentially wireless) actuators or controls that regulate current flow from the power source to the smart glass. The controller may, for example, limit the threshold maximum number of volts to 60 volts, or potentially to 38 volts.

Figure 4A:
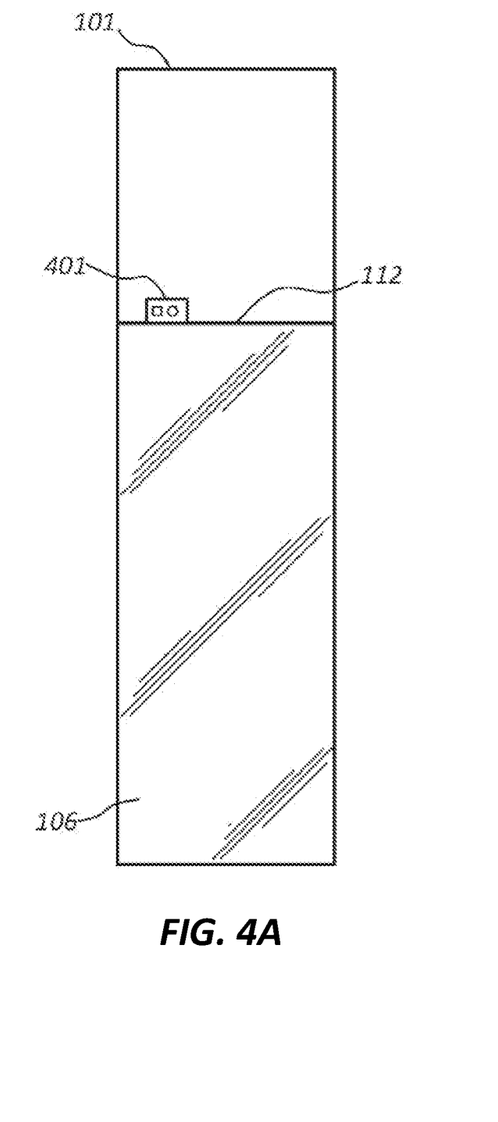
FIGS. 4A and 4B illustrate a smart glass wall panel with a controller that changes the opacity of the smart glass.
Figure 4B:
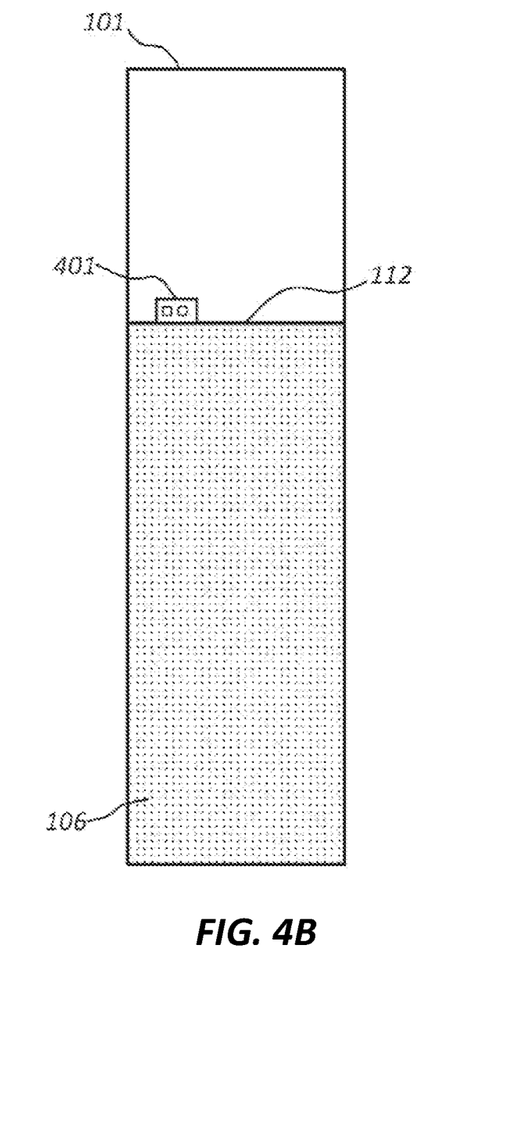

The controller also allows the frequency of the AC voltage sent to the smart glass pane 114 to be controlled. As shown in FIGS. 4A and 4B, a controller 401 may be part of the modular wall system 100. The controller may have physical buttons, knobs, switches or other control mechanisms that change various effects of the system. For instance, the controller 401 may have a button that turns the smart glass pane 114 on or off, as well as a knob that allows a user to change the frequency of the AC voltage sent to the smart glass pane 114. Changing the frequency changes the opacity of the smart glass. Thus, as shown in FIG. 4A, when the controller sets the AC voltage frequency to a specific value, the smart glass is transparent and, as shown in FIG. 4B, when the controller is set to an alternate value, the smart glass becomes semi-opaque, or entirely opaque.

The controller 401 may be used to adjust various characteristics of the power supply including frequency, voltage level, on or off status. In some cases, a controller may be used to control different sections of smart glass. Thus, for example, if a modular wall system included multiple different smart glass panes (e.g. 114), the controller 401 may be able to control each pane separately. The controller 401 may control the smart glass via a wired connection or, in some embodiments, may control the smart glass using a wireless connection that connects to a wireless radio among the smart glass circuitry. As such, a user may use an application on a phone or other mobile device to enter control commands that are carried out on the smart glass, including controlling frequency, voltage level and on or off status. Such an application may allow a user to control the smart glass for a plurality of different modular wall systems.

The user may be restricted in how much control he or she has over the voltage level or frequency. For instance, the voltage level may be limited by the threshold maximum number of volts. This keeps the smart glass pane safe for use even in a shower or bathroom scenario where water may be present. The user may be given a range in which the smart glass surface operates, and may change the voltage within that specified voltage range. This range may have a floor and ceiling which represent high and low values beyond which the device is not permitted to operate. This ensures that the modular wall system 100 maintains safe voltage operating parameters during use.

The smart glass pane 114 may be powered by a continuous connection (e.g. a wall power outlet) or, in some cases, via a battery. The power supply may be external to the modular wall system 100, or may be part of the circuitry shown in FIGS. 3 and 5. For instance, the power supply may be physically manufactured on a circuit that is substantially the same width as the smart glass pane, and is elongated to stretch along at least a portion of a panel edge. Accordingly, as shown in embodiment 500 of FIG. 5, the circuit board 501 is manufactured to be the same (or smaller) width than the smart glass pane 502. In this manner, the circuit board 501 can be affixed to the smart glass pane 502 along any edge of the pane. This makes the modular wall system 100 even more flexible in where and how it can be installed.

Figure 5:
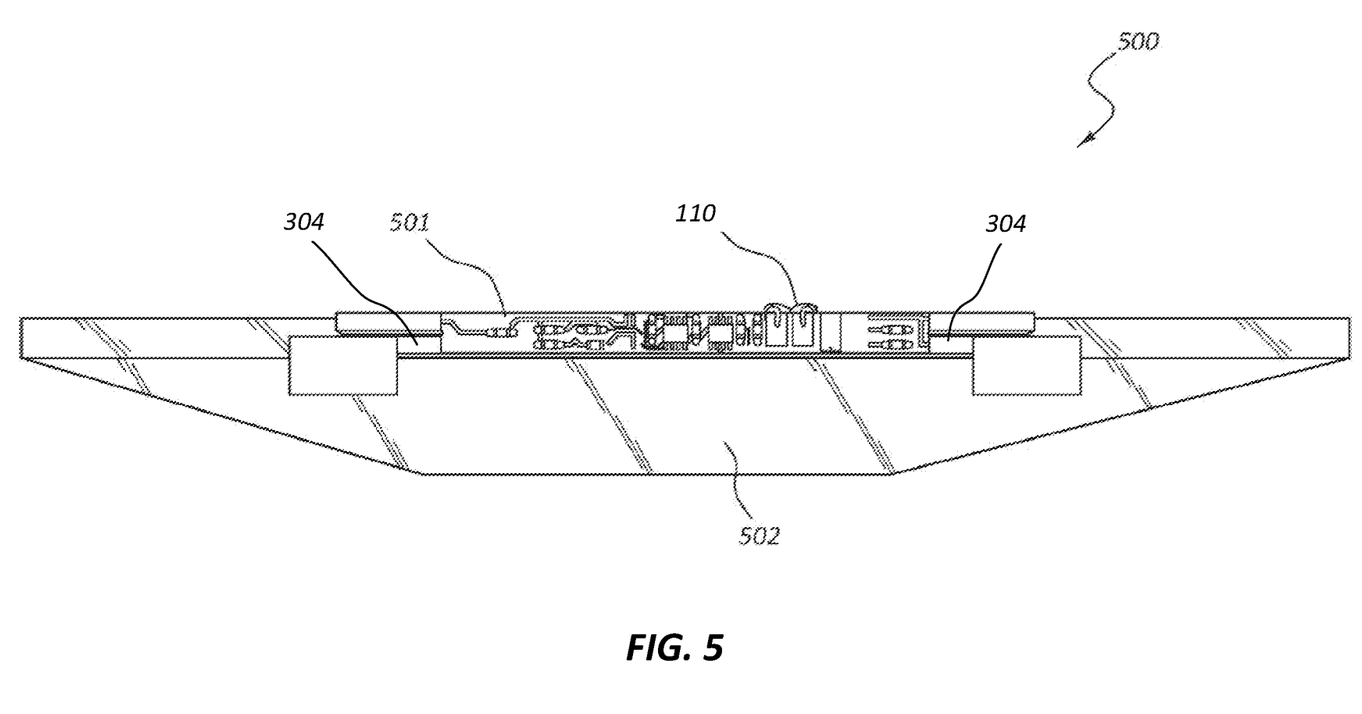
FIG. 5 illustrates a smart glass panel with a controller and corresponding circuitry installed on a smart glass pane.

The circuit board 501 can connect to the smart glass pane 502 using the electrical interfaces 304. These electrical interfaces apply the current from the power supply to the smart glass elements. Again, the amount of current or voltage applied may be controlled using controller 401. The power supply-lines 110 for the power supply 112 are configured to attach to at least a portion of the smart panel edges adjacent to the power supply. Thus, as shown in FIG. 1, the power supply lines 110 may run along an edge of the frame 101, and run along or beneath the horizontal stringer 103 to the power supply for that modular wall system. Each modular wall system may have the power lines run in a different way, and may have the circuit board with the power supply affixed in a different position on the window pane. This flexibility allows the modular wall panels described herein to be installed in a variety of different situations and configurations, and allows the installer flexibility to rotate, reposition or move the power supply (and associated circuitry) as needed to accommodate a given room or area.

In another embodiment, a smart glass controller is described. The smart glass controller (e.g. 401 of FIG. 4) includes a structural platform that interconnects one or more smart glass controller components. This structural platform may be a circuit board such as the circuit board 305 of FIG. 3 or circuit board 501 of FIG. 5. The circuit board may include an inverter 302 disposed thereon, which is configured to convert a direct current (DC) input voltage to an output alternating current (AC) voltage. Typically, this AC voltage will be 60 volts or less. The smart glass controller 401 electrically connects to a smart glass surface 106 and thereby provides the output AC voltage to the smart glass. The output voltage and frequency determine the opacity of the smart glass. The controller 401 may be used to adjust the frequency of the AC output signal such that any flickers in the opacity of the smart glass are reduced or removed.

The smart glass surface 106 is designed to operate at less than a threshold maximum voltage (e.g. 60 volts, or 32 volts). Within the range between zero and the threshold maximum, the user may adjust the opacity level of the smart glass surface by controlling frequency of the AC voltage. The smart glass controller 401 (or "control device") is in communication with the inverter and with the smart glass surface and, as such, the control device allows the frequency of the AC voltage to be adjusted and thereby control the opacity of the smart glass.

In some embodiments, the smart glass (or at least a portion thereof) may be constructed out of polymer-dispersed liquid crystals. These polymer-dispersed liquid crystals allow the smart glass to operate at a very low operating voltage, making the system safe for operation even near water. In some cases, the DC input voltage may be a voltage ranging from 6 volts to 24 volts, and the output AC voltage may be a voltage of 24 volts or less. The smart glass surface may thus be operable at less than 24 volts, and may still function as intended to change the smart glass opacity from transparent to semi-opaque to opaque. In some cases, the output AC voltage may be set to a frequency of 50 hertz, while in other cases, the frequency may be set higher or lower than 50 hertz.

Figure 6:
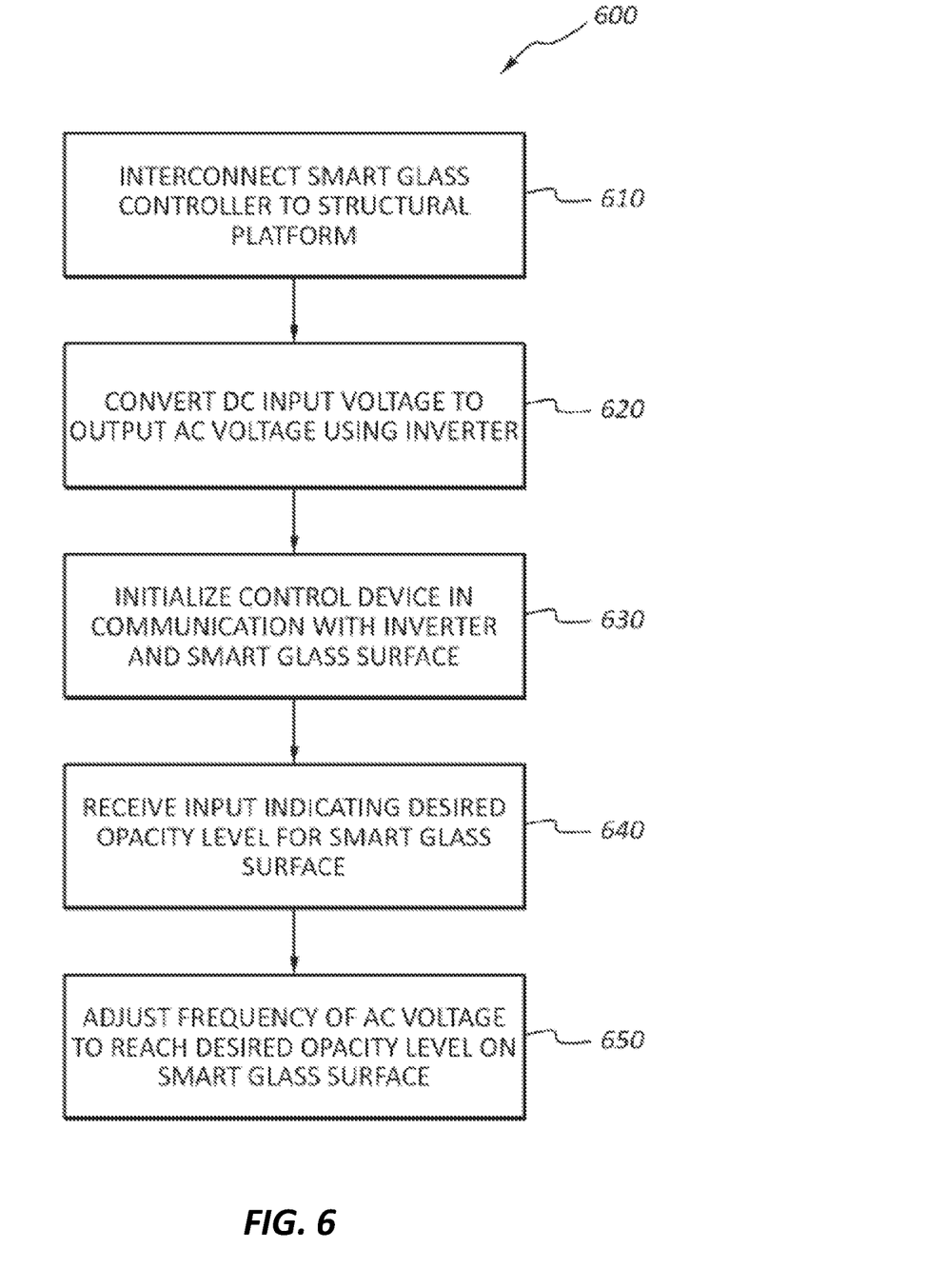
FIG. 6 illustrates a flowchart of a method for controlling opacity in a smart glass surface.

FIG. 6 describes a method 600 for controlling opacity in a smart glass surface. The method 600 includes interconnecting smart glass controller components (e.g. 302, 303) to a structural platform 305 of FIG. 3 (610). Next, the method 600 includes converting a DC input voltage to an output AC voltage using an inverter disposed on the structural platform (620), and initializing a control device in communication with the inverter and the smart glass surface (630). The control device is configured to change the frequency of the AC voltage and thereby control the opacity of the smart glass surface. The method 600 further includes receiving an input indicating a desired opacity level for the smart glass surface (640), and adjusting the frequency of the AC voltage such that the smart glass surface reaches the desired opacity level (650).

In method 600, the smart glass surface 106 is operable at less than a threshold maximum voltage (e.g. less than 30 or less than 24 volts). The control device implemented in the method can control various electrical components that are part of the circuit board 305. For instance, the control device can control the power supply, allowing more or less voltage to be output in the AC voltage that is output from the inverter. The control device may also adjust other characteristics of the power supply, to keep the voltage at the smart glass surface operating within a specified safe voltage range. For instance, the control device may implement and enforce a ceiling, so that the voltage is not allowed to exceed a specified threshold maximum number of volts.

In some embodiments, after the system has received control inputs from a user and has selected a specified AC output voltage and frequency, the system may receive another, subsequent input indicating a different desired opacity level for the smart glass surface. The control device can then adjust the frequency of the AC voltage in a manner that causes the smart glass surface to reach the new desired opacity level. Accordingly, a user may repeatedly change the opacity of the smart glass pane 114 as they desire. The smart glass pane 114 may thus be used in a modular wall system where the glass pane has its own power supply and controller. As such, the modular wall system 100 can be easily installed or removed from an installation and installed in another location. Moreover, the capability to operate at very low voltages allows the modular wall system to be installed in many locations where smart glass installations were previously prevented due to safety precautions.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A modular wall system comprising:
a frame comprising at least one horizontal stringer extending from a first side of the frame to a second side of the frame;
one or more first connectors positioned on at least one horizontal stringer; and
a decorative smart glass pane comprising:
one or more second connectors configured to attach to the first connectors on the horizontal stringer, wherein the second connectors and the first connectors physically attach the decorative smart glass pane to the modular wall system,
a power connector configured to receive a direct current (DC) input voltage from a power source,
a power inverter configured to convert the DC input voltage to an alternating current (AC) voltage, wherein:
(1) the power inverter is physically manufactured on a circuit that is substantially the same width as the decorative smart glass pane, and
(2) the power inverter is elongated to stretch along at least a portion of an edge of the decorative smart glass pane,
a controller configured to prevent the AC voltage from exceeding a threshold maximum number of volts, and
a smart glass surface in communication with an output of the power inverter, wherein the smart glass surface is operable at a voltage less than the threshold maximum number of volts.

2. The modular wall system of claim 1, wherein the frame comprises a free-standing frame.

3. The modular wall system of claim 1, wherein the threshold maximum number of volts is one of 38 volts and 60 volts.

4. The modular wall system of claim 1, wherein the controller is configured to control a frequency of the AC voltage and to eliminate flickering of an opacity of the smart glass surface by adjusting a value of the frequency of the AC voltage corresponding to a first state of opacity.

5. The modular wall system of claim 1, wherein the controller is configured to regulate a current flow from the power source.

6. The modular wall system of claim 5, wherein one or more power supply lines for the power source are configured to attach to at least a portion of smart panel edges adjacent to the power source.

7. The modular wall system of claim 1, wherein the controller is configured to control a frequency of the AC voltage, and the controller changes an opacity of the smart glass by changing the frequency of the AC voltage.

8. The modular wall system of claim 1, wherein the controller prevents the AC voltage from exceeding the threshold maximum number of volts by adjusting one or more characteristics of the power source and/or power inverter, such that the smart glass surface is switchable between respective opacity levels without the AC voltage exceeding the threshold maximum number of volts.

9. The modular wall system of claim 1, wherein the controller controls the AC voltage by enforcing a ceiling that prevents the AC voltage from exceeding the threshold maximum number of volts.

10. A smart glass controller comprising:

a structural platform configured to interconnect one or more smart glass controller components;

an inverter disposed on the structural platform configured to convert a direct current (DC) input voltage to an alternating current (AC) voltage and to output the AC voltage, wherein:
  (1) the inverter is physically manufactured on a circuit that is substantially the same width as a smart glass surface, and
  (2) the inverter is elongated to stretch along at least a portion of an edge of the smart glass surface;

the smart glass surface in communication with the AC voltage from the inverter, the smart glass surface having an associated opacity level that is adjustable according to a frequency of the AC voltage; and a control device in communication with the inverter and the smart glass surface, the control device adjusting the frequency of the AC voltage to control opacity of the smart glass surface, wherein the control device prevents the AC voltage from exceeding a threshold maximum number of volts.

11. The smart glass controller of claim 10, wherein at least a portion of the smart glass surface comprises polymer-dispersed liquid crystals.

12. The smart glass controller of claim 10, wherein the DC input voltage comprises a voltage ranging from 6 volts to 24 volts.

13. The smart glass controller of claim 10, wherein the AC voltage comprises a voltage of less than 24 volts, and wherein the smart glass surface is operable at less than 24 volts.

14. The smart glass controller of claim 10, wherein the control device is configured to receive an input of a user and eliminates flickering of the opacity of the smart glass surface by adjusting the frequency of the AC voltage in accordance with the input of the user.

15. A method for controlling an opacity in a smart glass surface, the method comprising:

interconnecting one or more smart glass controller components to a structural platform;

converting a direct current (DC) input voltage to an alternating current (AC) voltage using an inverter disposed on the structural platform, wherein:
  (1) the inverter is physically manufactured on a circuit that is substantially the same width as a decorative smart glass surface, and
  (2) the inverter is elongated to stretch along at least a portion of an edge of the decorative smart glass surface;

inputting the AC voltage to the smart glass surface;

initializing a control device in communication with the inverter and the smart glass surface, the control device preventing the AC voltage input to the smart glass surface from exceeding a threshold maximum number of volts, and the control device being configured to change a frequency of the AC voltage and thereby control the opacity of the smart glass surface;

receiving an input indicating a desired opacity level for the smart glass surface; and changing the frequency of the AC voltage such that the smart glass surface reaches the desired opacity level.

16. The method according to claim 15, wherein the smart glass surface is operable at less than a threshold maximum voltage.

17. The method according to claim 15, wherein the control device prevents the AC voltage from exceeding the threshold maximum number of volts by adjusting one or more characteristics of a power source and/or power inverter, such that the smart glass surface is switchable between respective opacity levels without exceeding the threshold maximum number of volts.

18. The method according to claim 15, wherein the control device controls the AC voltage by enforcing a ceiling that prevents the AC voltage from exceeding the threshold maximum number of volts.

19. The method according to claim 15, further comprising:

receiving a subsequent input indicating a second, different desired opacity level for the smart glass surface; and adjusting the frequency of the AC voltage such that the smart glass surface reaches the second, different desired opacity level.

* * * * *